US012782242B2

(12) United States Patent
Orozco et al.

(10) Patent No.: US 12,782,242 B2
(45) Date of Patent: Nov. 3, 2026

(54) EXERCISE SYSTEM TEST STATION SYSTEMS AND METHODS

(71) Applicant: PELOTON INTERACTIVE, INC., New York, NY (US)

(72) Inventors: Luis Orozco, Cedar Park, TX (US); Fabiola De La Cueva, Cedar Park, TX (US); Rui Chen, Farmington Hills, MI (US); Hardikkumar D. Patel, New York, NY (US); Peter A. Kaltenbach, Austin, TX (US); Brad P. Collins, Austin, TX (US); Robert A. Durfee, Atlanta, GA (US)

(73) Assignee: PELOTON INTERACTIVE, INC., New York, NY (US)

( * ) Notice: Subject to any disclaimer, the term of this patent is extended or adjusted under 35 U.S.C. 154(b) by 280 days.

(21) Appl. No.: 18/611,626

(22) Filed: Mar. 20, 2024

(65) Prior Publication Data

US 2024/0230476 A1 Jul. 11, 2024

Related U.S. Application Data

(63) Continuation of application No. PCT/US2022/043694, filed on Sep. 15, 2022.

(Continued)

(51) Int. Cl.
*G01M 99/00* (2011.01)

(52) U.S. Cl.
CPC .................................. *G01M 99/008* (2013.01)

(58) Field of Classification Search
CPC ............. G01M 99/008; A63B 2225/02; G05B 2219/32183; G05B 2219/32388; G05B 19/41875; G05B 19/41895
See application file for complete search history.

(56) References Cited

U.S. PATENT DOCUMENTS

| | | | | |
|---|---|---|---|---|
| 2020/0039747 A1 | | 2/2020 | Ahmann et al. | |
| 2023/0191190 A1 | * | 6/2023 | Lagree | A63B 21/023 482/9 |

FOREIGN PATENT DOCUMENTS

| | | | | |
|---|---|---|---|---|
| CN | 108510866 A | * | 9/2018 | G09B 25/02 |
| CN | 110793477 B | | 7/2021 | |

(Continued)

OTHER PUBLICATIONS

Translation CN108510866A (Year: 2018).*

*Primary Examiner* — Thomas M Hammond, III

(74) *Attorney, Agent, or Firm* — Haynes and Boone, LLP

(57) ABSTRACT

Exercise system test station systems and methods are provided. The test station may include a frame and a trolley movably coupled to the frame. The trolley may include at least one deployable test assembly configured to perform one or more tests on an exercise system when the exercise system is positioned within the frame. The test station may include a workstation and/or a safety light curtain. The at least one deployable test assembly may include a spinner assembly configured to drive a portion of the drivetrain of the exercise system, a knob tester mechanism, a sound and vibration test module, or any combination thereof. The test station may be provided as part of a production line. The product line may include an AGV configured to carry the exercise system through production. Associated methods of testing the exercise system using the test station are also provided.

20 Claims, 13 Drawing Sheets

Related U.S. Application Data

(60) Provisional application No. 63/246,768, filed on Sep. 21, 2021.

(56) References Cited

FOREIGN PATENT DOCUMENTS

| | | | | |
|---|---|---|---|---|
| DE | 102019206849 | A1 * | 11/2020 | ......... B05B 13/0433 |
| TW | 201335726 | A | 9/2013 | |
| TW | I582035 | B | 5/2017 | |

* cited by examiner

EXERCISE SYSTEM TEST STATION SYSTEMS AND METHODS

CROSS-REFERENCE TO RELATED APPLICATIONS

This application is a continuation of International Patent Application No. PCT/US2022/043694 filed Sep. 15, 2022, which claims priority to U.S. Provisional Patent Application No. 63/246,768 filed Sep. 21, 2021, all of which are hereby incorporated by reference in their entirety.

TECHNICAL FIELD

One or more embodiments relate generally to exercise system test and calibration and, more particularly, to systems and methods for testing and/or calibrating an exercise system at a test station.

BACKGROUND

Production exercise systems (e.g., bikes, treadmills, etc.) may need to be calibrated or otherwise tested as part of a quality control program. Existing calibration and/or quality control testing can be time consuming and are subject to differences between human operators. Therefore, there is a need in the art for systems and methods that address the deficiencies noted above, other deficiencies known in the industry, or at least offers an alternative to current techniques.

SUMMARY

According to one or more embodiments of the present disclosure, an exercise system test station may include a frame and a trolley coupled to the frame. The trolley may include at least one deployable test assembly configured to perform one or more tests on an exercise system when the exercise system is positioned within the frame. Embodiments of the present disclosure may include methods of testing the exercise system using the test station. Embodiments of the present disclosure may include methods of operating the test station. The methods may include deploying a deployable test assembly from the trolley and performing one or more tests on the exercise system. The methods may include positioning an automated guided vehicle (AGV) within the test station, the AGV carrying the exercise system through production According to one or more embodiments of the present disclosure, an exercise system production line may include a test station and an automated guided vehicle (AGV) configured to carry an exercise system through production. The test station may include a frame and a trolley coupled to the frame. The frame may allow the AGV to pass through as the AGV moves along the production line. The trolley may include at least one deployable test assembly configured to perform one or more tests on the exercise system when the AGV is positioned within the frame. Embodiments of the present disclosure include methods of testing the exercise system while positioned on the AGV in the test station. Embodiments of the present disclosure include methods of operating the production line. The methods may include positioning the AGV within the test station, the AGV carrying the exercise system through production. The methods may include deploying a deployable test assembly from the trolley and performing one or more tests on the exercise system.

According to one or more embodiments of the present disclosure, a method may include positioning an automated guided vehicle (AGV) within a test station along a production line, the AGV carrying an exercise system through production. The method may include deploying at least one test assembly from the test station to perform one or more tests on the exercise system when the AGV is positioned within the test station.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of the exercise system test station described herein and should not be construed as a complete depiction of the scope of the exercise system.

Embodiments of the disclosure and their advantages are best understood by referring to the detailed description that follows. It should be appreciated that like reference numerals may be used to identify like elements illustrated in one or more of the figures.

DETAILED DESCRIPTION

According to the present disclosure, exercise system test station systems and methods are provided. The test station may include a design compatible with current and future technology. For example, the test station may support current and future products, product lines, factories, or the like. The test station may be durable and utilize reusable parts and assemblies. The test station may be compatible with factory workflow and product lifespan (e.g., functional test and calibration, end of line, final quality check, ongoing reliability test, characterization, etc.). The test station may support current and future software integration.

Figure 1:
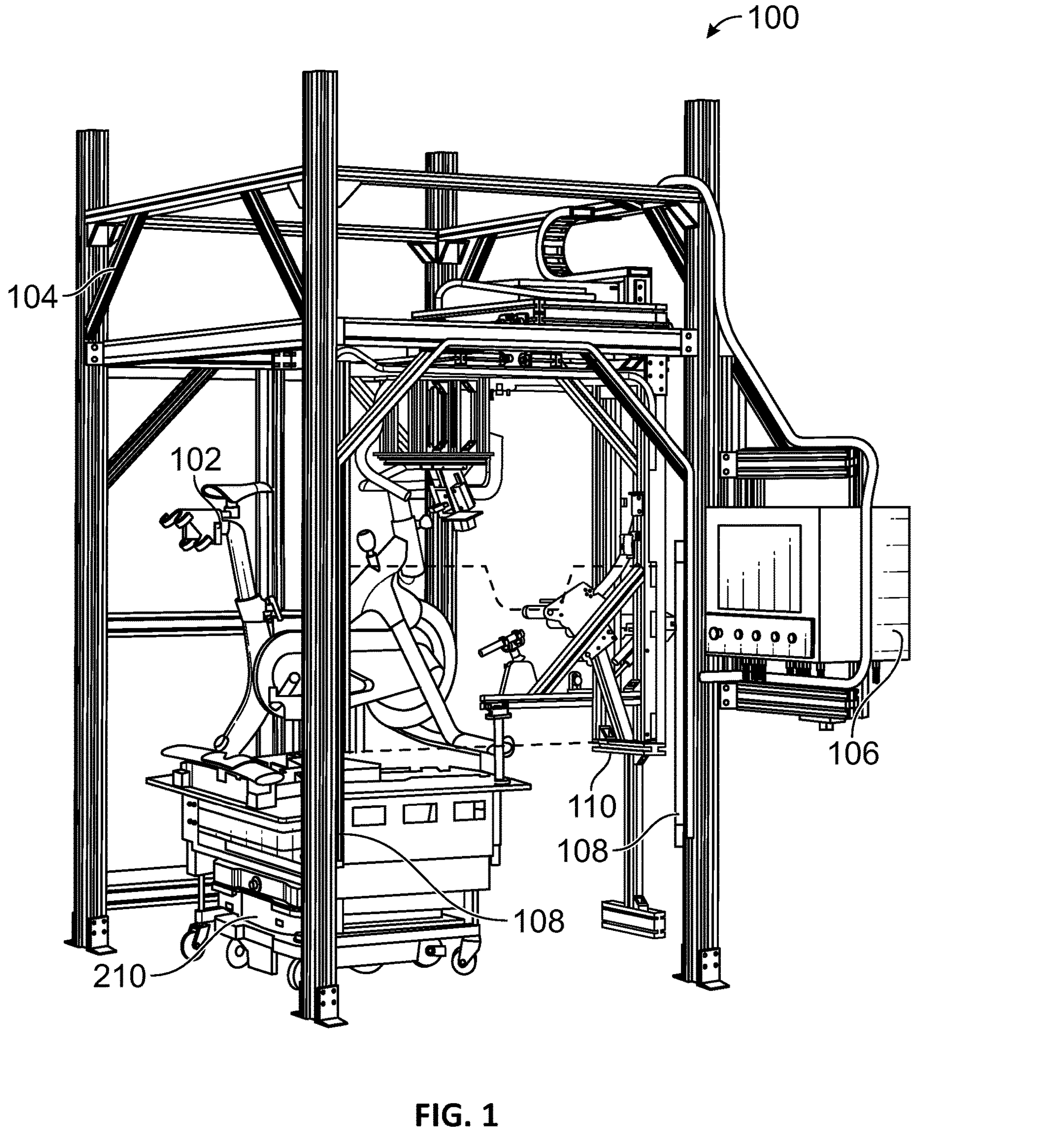
FIG. 1 illustrates an exercise system test station, in accordance with an embodiment of the disclosure.

FIG. 1 illustrates an exercise system test station 100, in accordance with an embodiment of the disclosure. Referring to FIG. 1, the test station 100 may be modular, with the modular test station 100 configurable for various exercise systems 102 (e.g., bikes, treadmills, other exercise equipment, etc.) and to accommodate a range of tests in the context of an assembly or production line. For example, the test station 100, which may be referred to as a test cell, may be configurable to accommodate calibration tests, end of line or final quality checks, reliability tests, or the like. The test station 100 may include various configurations. For example, the test station 100 may include a frame 104, a workstation 106, a safety light curtain 108, and a trolley 110, among other components, as explained below.

Figure 2:
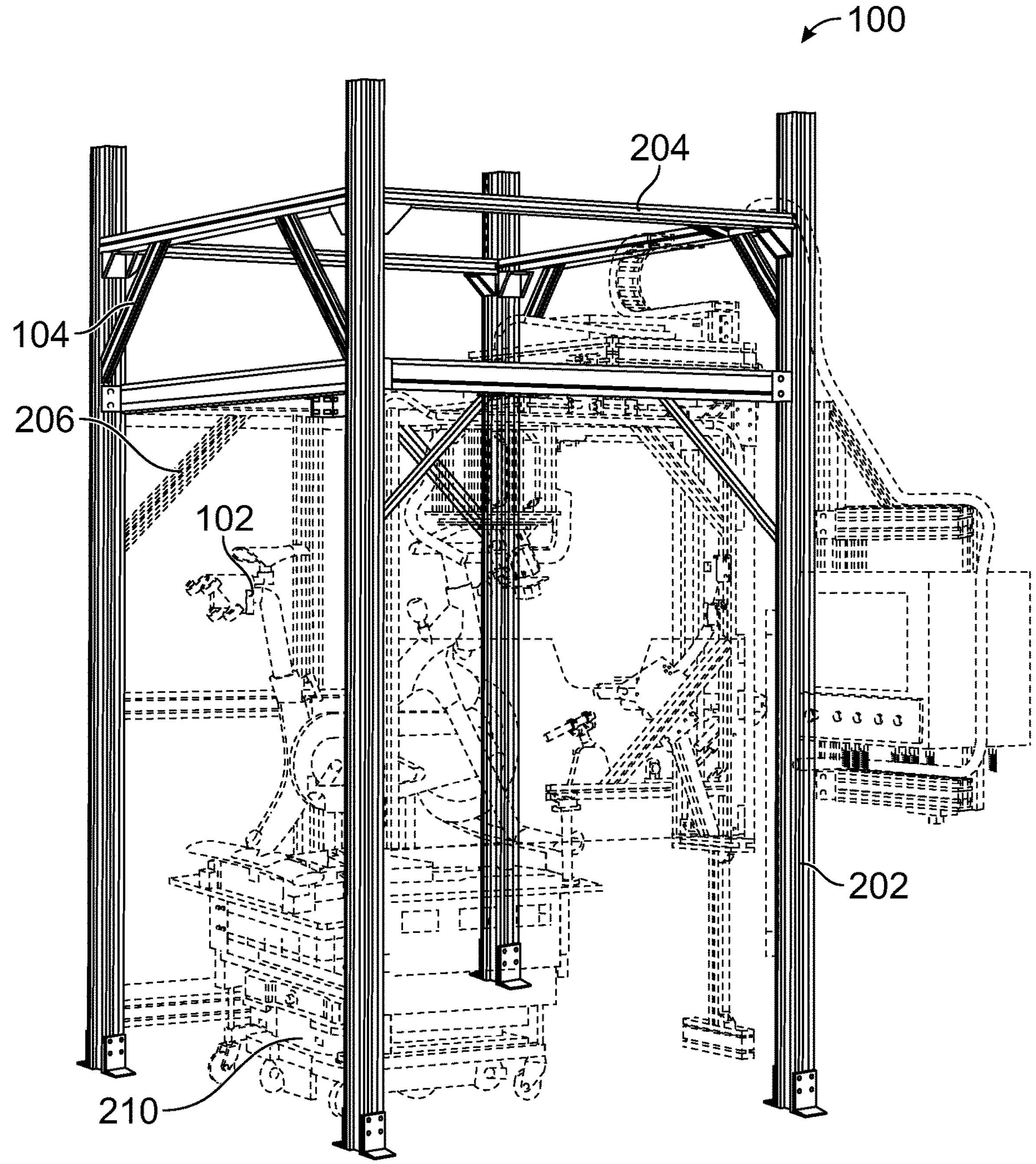
FIG. 2 illustrates a frame of the test station, in accordance with an embodiment of the disclosure.

FIG. 2 illustrates the frame 104 of the test station 100, in accordance with an embodiment of the disclosure. The frame 104 is the overall structural element of the test station 100. The frame 104 may include various configurations. For example, the frame 104 may include one or more posts 202, crossmembers 204, and gussets 206 providing a desired shape and structural strength. The posts 202 may be secured to the factory floor, such as bolted to the factory floor. The frame 104 may be welded, bolted, or otherwise secured together.

The frame 104 may allow the exercise system 102 to pass through as the exercise system 102 moves along an assembly or production line. In embodiments, the production line may utilize an automated guided vehicle (AGV) 210 to move the exercise system 102 on the factory floor. For example, an AGV 210 may carry an initial, not finished, exercise system 102 to be produced or assembled along the production line. In such embodiments, the frame 104 may allow the AGV 210 to pass through as the AGV 210 moves along the production line. As described more fully below, various tests, such as semi-automated tests, can be deployed from the frame 104. For example, various robots, assemblies, or other devices may be deployed from the frame 104 to modify, build, or transform the initial product to the final exercise system 102.

Figure 3:
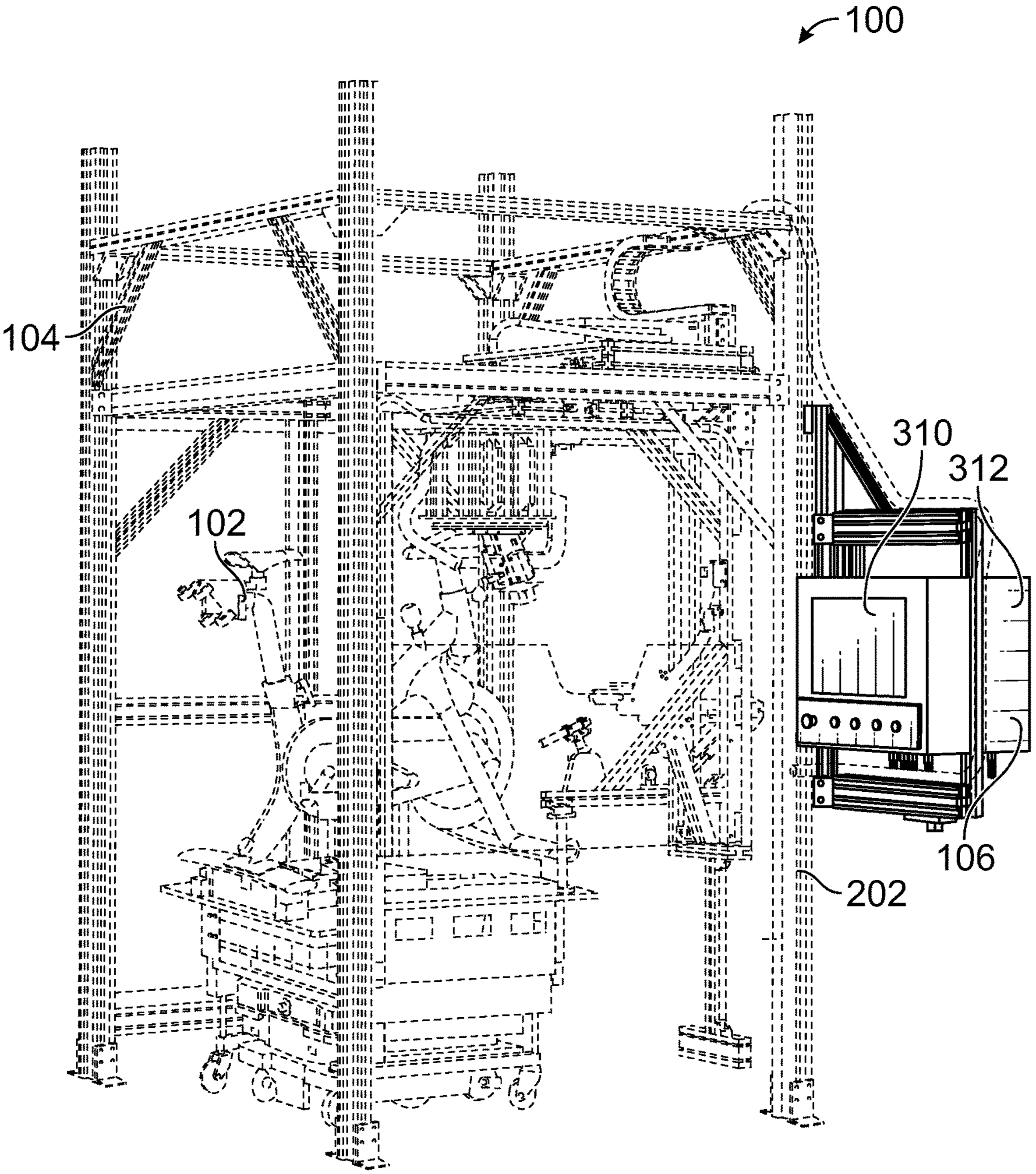
FIG. 3 illustrates a workstation of the test station, in accordance with an embodiment of the disclosure.

FIG. 3 illustrates the workstation 106 of the test station 100, in accordance with an embodiment of the disclosure. Referring to FIG. 3, the workstation 106 may hold a test computer, which manages the test(s) to the exercise system 102 and communicates with the factory. The workstation 106 may include automation controls, power systems, and safety interlocks/lockouts, or any combination thereof. The test computer may be held within a front enclosure 310 of the workstation 106. A rear enclosure 312 of the workstation 106 may house the automation controls, power systems, and safety interlocks/lockouts. As shown, the workstation 106 may be connected to a post 202 of the frame 104.

Figure 4:
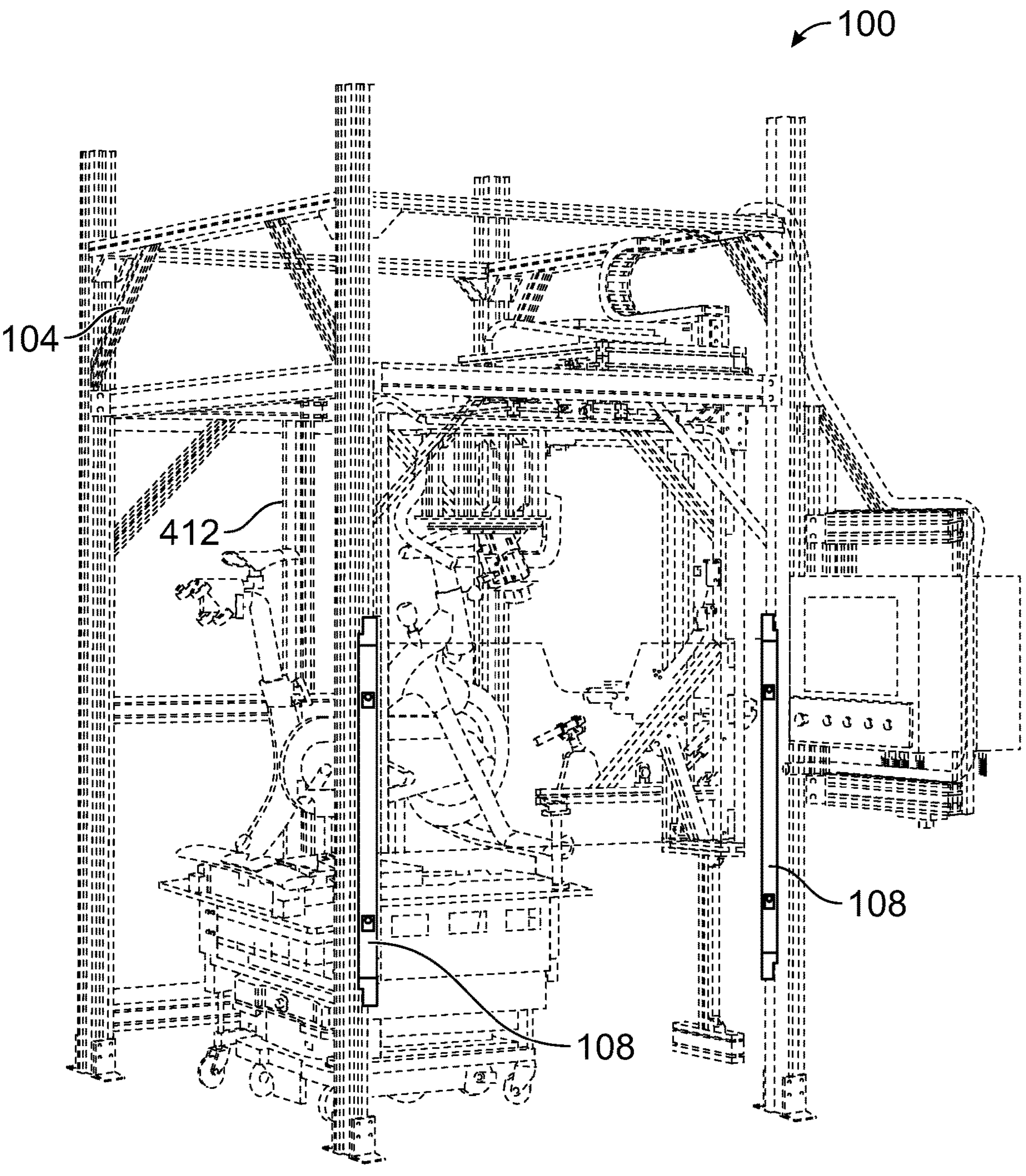
FIG. 4 illustrates a safety light curtain of the test station, in accordance with an embodiment of the disclosure.

FIG. 4 illustrates the safety light curtain 108 of the test station 100, in accordance with an embodiment of the disclosure. Referring to FIG. 4, the safety light curtain 108, which may be simply referred to as a curtain, may be positioned and/or configured to protect the test station 100, such as to protect the operator-accessible side of the test station while using a physical barrier 412 to prevent access from the opposite side of the frame 104, or to protect all four sides of the test station 100, among other contemplated configurations. If anything breaks light beams of the curtain 108 while a test is in progress, the system may enter a safe mode. The safe mode may stop or otherwise limit the test in progress and prevent additional tests from being performed. Once in safe mode, it may be required to manually reset the system prior to restarting the test. As shown, the safety light curtain 108 may be attached to the posts 202 of the frame 104.

Figure 5:
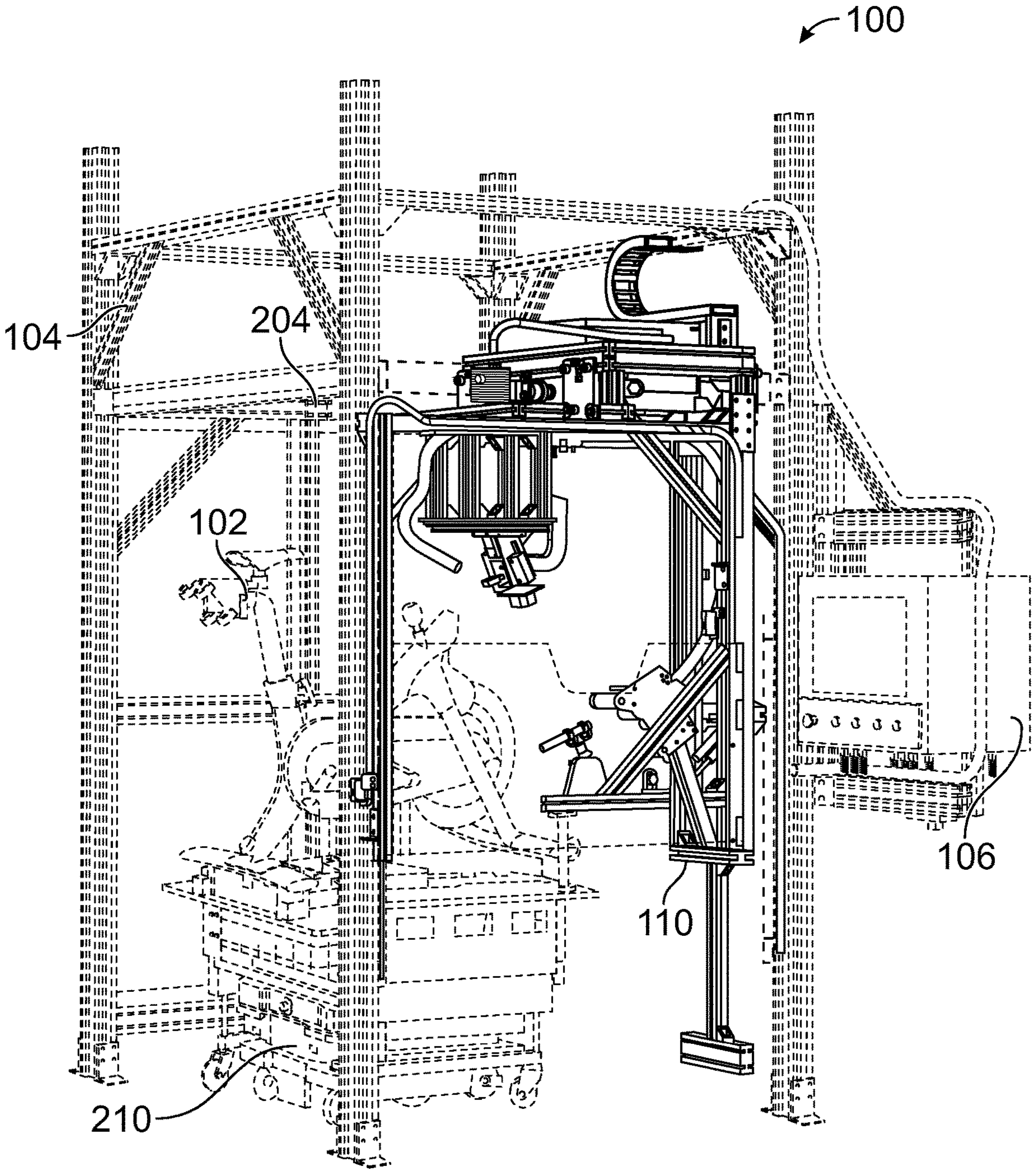
FIG. 5 illustrates a trolley of the test station in a parked position, in accordance with an embodiment of the disclosure.
Figure 6:
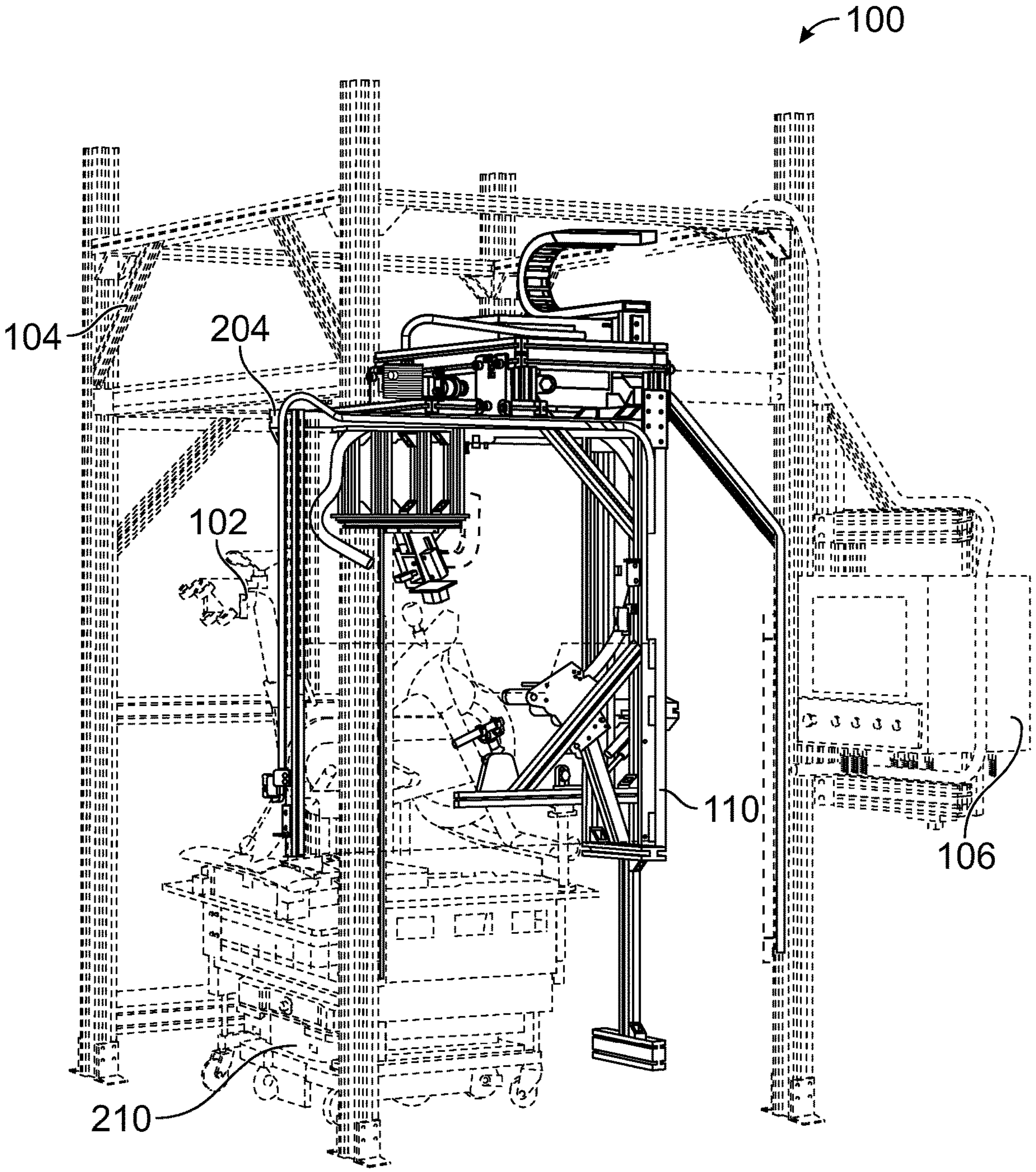
FIG. 6 illustrates the trolley in a deployed position, in accordance with an embodiment of the disclosure.

FIG. 5 illustrates the trolley 110 of the test station 100 in a parked position, in accordance with an embodiment of the disclosure. FIG. 6 illustrates the trolley 110 in a deployed position, in accordance with an embodiment of the disclosure. Referring to FIGS. 5-6, the trolley 110 may be an automated element that holds all the test interfaces that will interact with the exercise system 102. The trolley 110 may be configured in various ways depending on the test or tests being performed. For example, one or more test elements may be added to or removed from the trolley 110 based on the test(s) to be performed on the exercise system 102. The trolley 110 may house power and one or more control enabling communication to the workstation 106 (e.g., through a minimum number of cables), such as power, ethernet, USB communication, wireless communication, and safety interlocks.

Referring to FIG. 5, the trolley 110 may be positioned in a first position (e.g., a parked position). The parked position may allow the AGV 210 and/or exercise system 102 to pass through the test station 100 without interference. Referring to FIG. 6, the trolley 110 may move from the parked position to a second position (e.g., a deployed position). The trolley 110 may be deployed to its second position based on the position of the AGV 210 within the test station 100. For example, the trolley 110 may move to the deployed position after the AGV 210 has correctly positioned itself in the test station 100. Once the trolley 110 is deployed, one or more test elements may be deployed or utilized on the exercise system 102. As shown, the trolley 110 may be coupled, such as slidably coupled, to a crossmember 204 of the frame 104. A motor or actuator may move (e.g., slide) the trolley 110 to a desired position (e.g., to the first position, to the second position, or anywhere between the first position and the second position), or the trolley 110 may be moved into position by hand. A sensor or sensor assembly may be used to determine the position of the trolley 110 within the test station 100.

Figure 7:
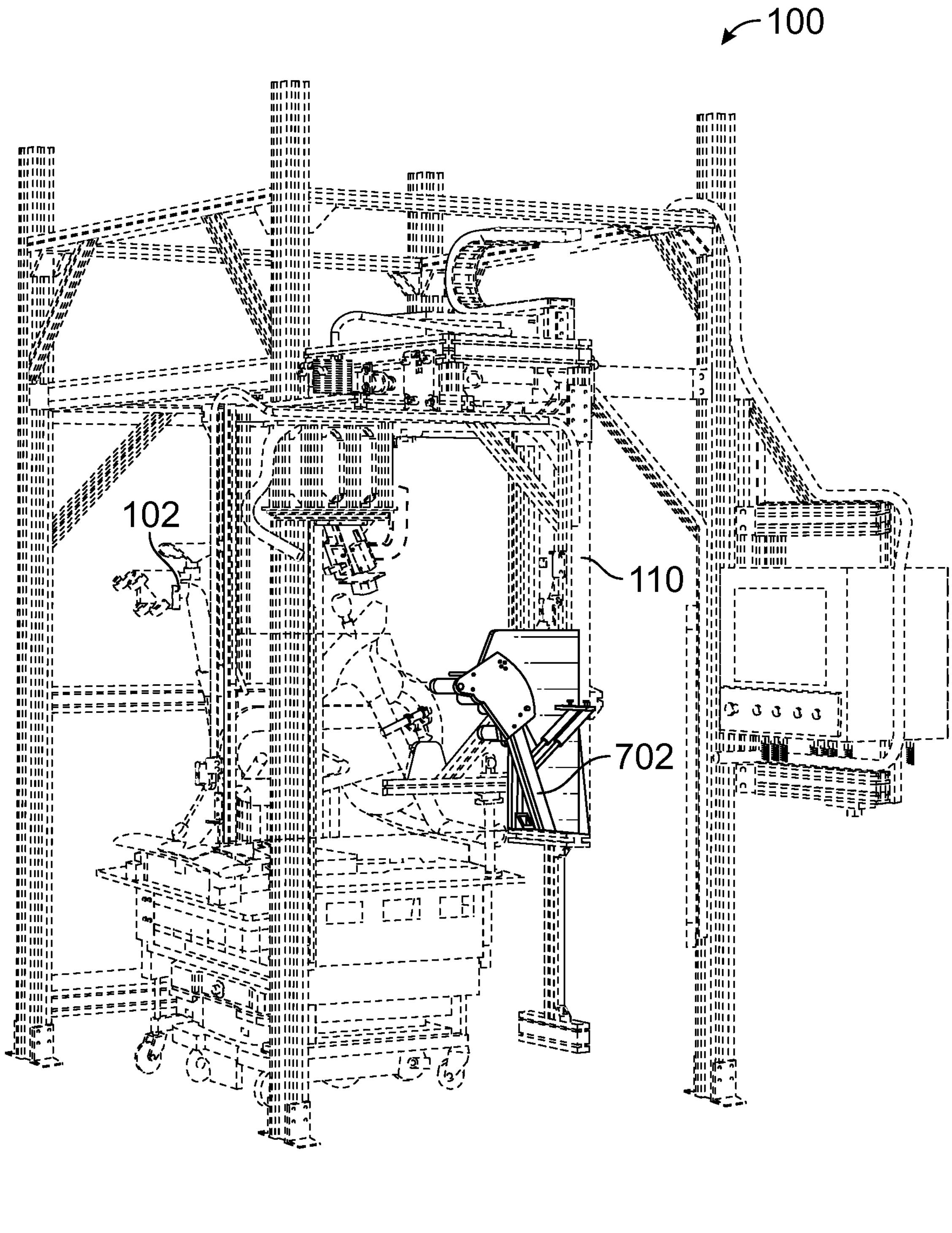
FIG. 7 illustrates a spinner assembly of the test station, in accordance with an embodiment of the disclosure.

FIG. 7 illustrates a spinner assembly of the test station 100, in accordance with an embodiment of the disclosure. Referring to FIG. 7, the trolley 110 may include a spinner assembly 702. For tests that require moving the drivetrain of the exercise system 102, the spinner assembly 702 can drive a portion of the drivetrain (e.g., a flywheel, wheel, etc.) and as a result the entire drivetrain of the exercise system 102. The spinner assembly 702 may include a drive motor, an encoder (e.g., to measure flywheel speed and position), and a moving idler (kicker) to disengage the drive motor while maintaining contact between the encoder and the drivetrain. The spinner assembly 702 may include one or more rollers that engage the exercise system 102 to cause the drivetrain to turn. For example, the spinner assembly 702 may engage with the flywheel to cause the flywheel to turn.

Figure 8:
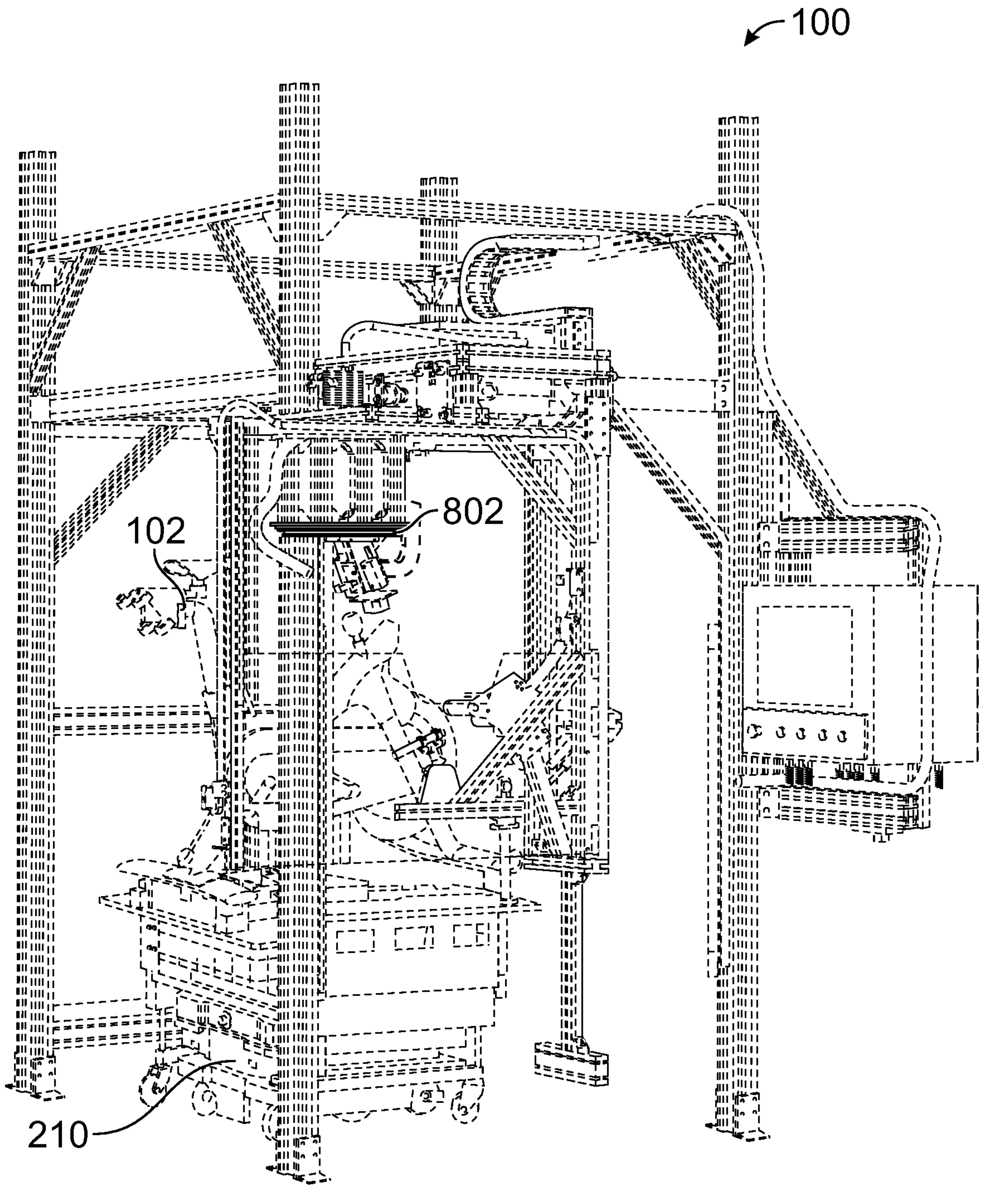
FIG. 8 illustrates an adjustment plate of the test station, in accordance with an embodiment of the disclosure.

FIG. 8 illustrates an adjustment plate of the test station 100, in accordance with an embodiment of the disclosure. Referring to FIG. 8, the test station 100 may include an adjustment plate 802. The adjustment plate 802 may be movable (e.g., in the XY-plane) to accommodate for the allowed tolerance in position of the AGV 210 within the test station 100. For example, one or more test assemblies that interact with the AGV 210 and/or exercise system 102 may be mounted on the adjustment plate 802. In such embodiments, the adjustment plate 802 may move, allowing the one or more mounted test assemblies to adjust to the position of the AGV 210 and/or exercise system 102 within the test station 100, such as to adjust to the positional tolerance provided by the AGV 210. The adjustment plate 802 may be moved by hand or by a motor/actuator to a desired position. For example, the adjustment plate 802 may be moved into position automatically based on sensor feedback (e.g., based on the position of the AGV 210 and/or exercise system 102 within the test station 100).

Figure 9:
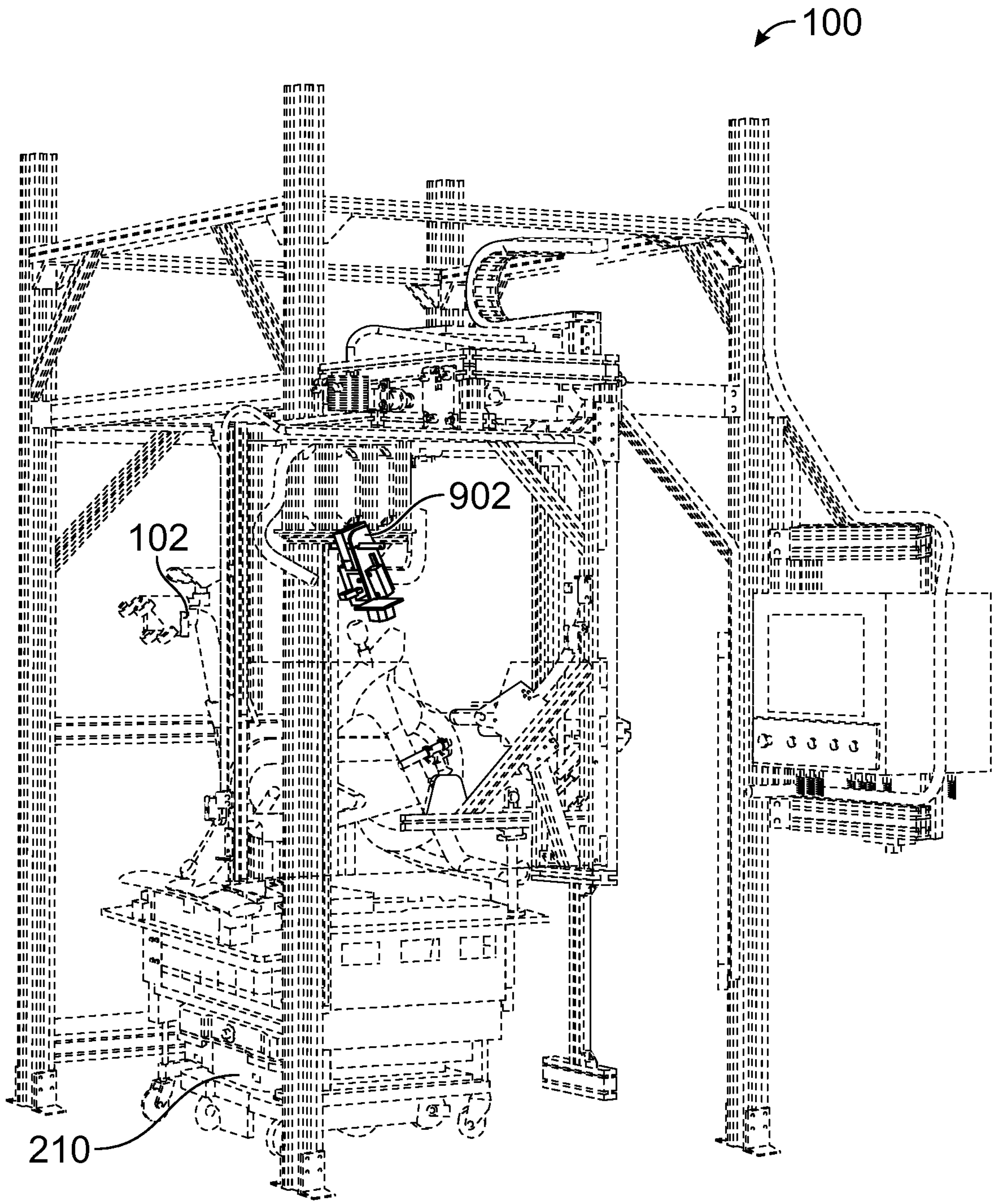
FIG. 9 illustrates a knob tester mechanism of the test station, in accordance with an embodiment of the disclosure.

FIG. 9 illustrates a knob tester mechanism of the test station 100, in accordance with an embodiment of the disclosure. Referring to FIG. 9, the test station 100 may include a knob tester mechanism 902. The knob tester mechanism 902 may include various devices configured to rotate one or more elements of the exercise system 102. For example, the knob tester mechanism 902 can turn a knob of the exercise system 102 via a motor, such as a stepper motor or another type of motor based on a required speed, force, and/or accuracy. In embodiments, the knob tester mechanism 902 may engage the brakes by activating a linear airslide, although other configurations are contemplated. The interface between the motor/airslide and knob may be through a custom-shaped coupler, which mates with the inside structure of the knob and can impart a force on the top knob surface. In some embodiments, the knob tester mechanism 902 may measure torque applied to the knob. The airslide force can be calibrated by adjusting the piston air pressure. The knob tester mechanism 902 may be mounted on the adjustment plate 802. In such embodiments, the adjustment plate 802 may allow the knob tester mechanism 902 to adjust to the position of the AGV 210 and/or exercise system 102 within the test station 100, such as to adjust for the positional tolerance of the AGV 210.

Figure 10:
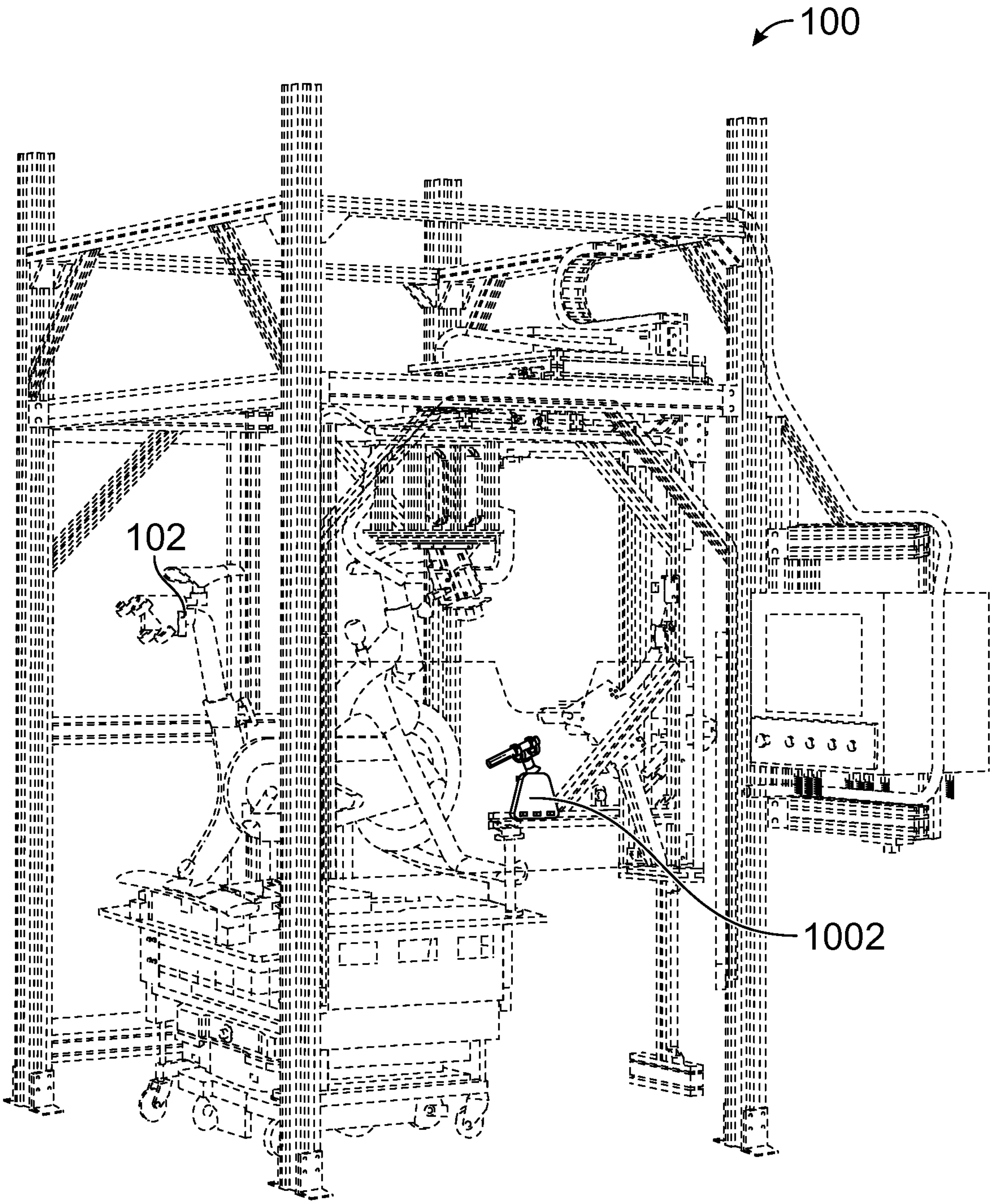
FIG. 10 illustrates a sound and vibration test module of the test station in a deployed position, in accordance with an embodiment of the disclosure.

FIG. 10 illustrates a sound and vibration test module 1002 of the test station 100, in accordance with an embodiment of the disclosure. In this embodiment, the sound and vibration module 1002 is attached to the trolley assembly. FIG. 10 illustrates the sound and vibration test module 1002 with the trolley in a deployed position, in accordance with an embodiment of the disclosure. In embodiments, the drivetrain can be tested for misalignment and other defects by measuring sound and/or vibration (e.g., at the belt guard or frame).

Sound and vibration testing may be an automated test, requiring no operator intervention. For example, a sound sensor may be mounted on a trolley attachment such that when the trolley is in the deployed position, the sound sensor is physically close to the unit under test as shown in FIG. 10. A vibration sensor may also be mounted on a trolley attachment such that when the trolley is in the deployed position, the vibration sensor is in contact with a surface on the unit under test, while at the same time isolated from vibrations on the trolley or frame. For example, FIG. 10 illustrates the sound and vibration test module 1002 deployed on the exercise system 102. The position for the sound and vibration test module 1002 may be on an attachment arm of the trolley 110, although other configurations are contemplated. This position may keep the sound and vibration test module 1002 out of the safety light curtain 108 when parked. In other embodiments, a magnetic sensor may inform the test system (e.g., the workstation 106) that the sound and vibration test module 1002 is parked, which may be a requirement to finish the test and allow the AGV 210 to depart the test station 100.

The various test assemblies of test station 100 may be used to calibrate exercise system 102. Calibration ensures every exercise system 102 coming off the production line is calibrated to the same standard. In addition to providing quality control, calibration may allow a performance comparison between two or more riders exercising on different exercise systems 102. For example, the test station 100 may initiate a sequence to calibrate the resistance applied to a flywheel of exercise system 102 (e.g., via knob tester mechanism 902), including identifying a motor (e.g., a stepper motor) position for a minimum resistance, a calibrated maximum resistance, and various steps in between. The calibration values mapping the stepper motor positions to calibrated resistance values may be stored on the exercise system 102.

Figure 11:
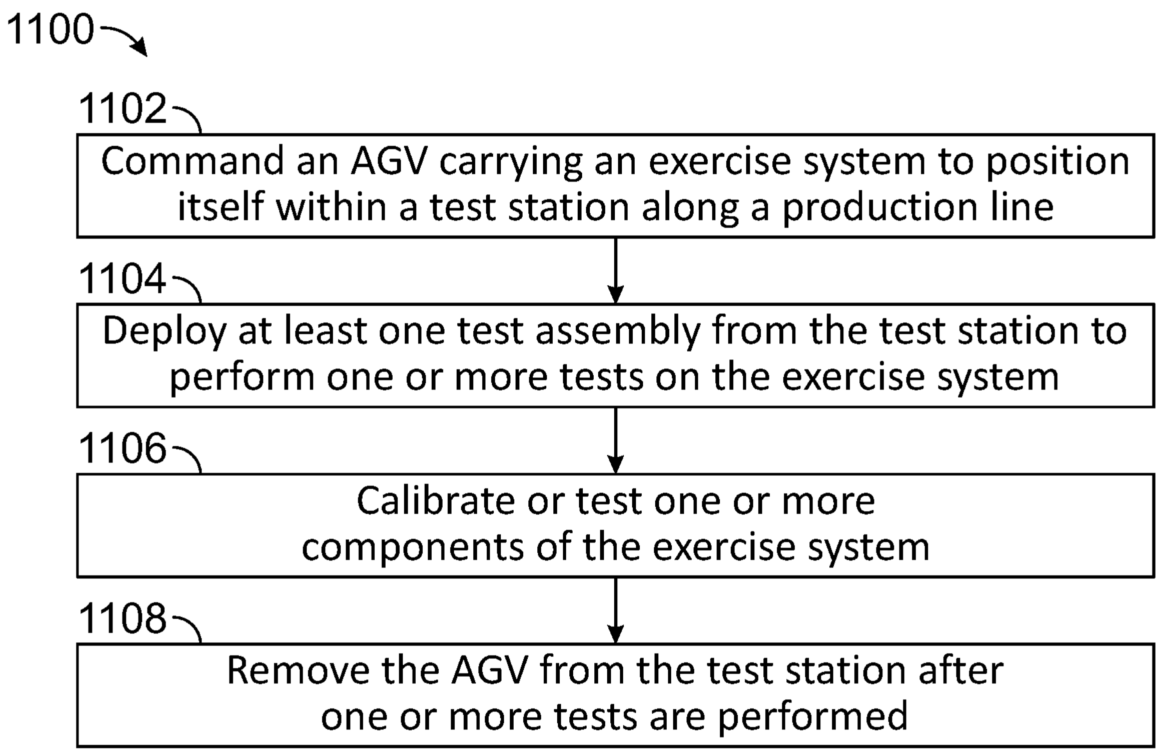
FIG. 11 illustrates a flowchart of a process of performing one or more tests on an exercise system, in accordance with an embodiment of the disclosure.

FIG. 11 illustrates a flowchart of a process 1100 of performing one or more tests on an exercise system, in accordance with an embodiment of the disclosure. It should be appreciated that any step, sub-step, sub-process, or block of process 1100 may be performed in an order or arrangement different from the embodiments illustrated by FIG. 11. For example, in other embodiments, one or more blocks may be omitted from or added to the process 1100.

In block 1102, process 1100 includes commanding an automated guided vehicle (AGV) to position itself within a test station along a production line. In particular, the AGV may carry an exercise system through production. For example, AGV 210 may be positioned within test station 100 as part of an assembly or production line for exercise system 102, described above. The AGV may carry the exercise system along a defined or marked path/route through production, such as using radio waves, vision cameras, magnets, lasers, gyroscopic, natural targeting, or geoguidance, for navigation, although other configurations are contemplated. Block 1102 may include locating the AGV within a frame of the test station. For example, once AGV has positioned itself inside the test station, one or more sensors may detect the location of the AGV to position the trolley and/or test equipment in the correct position with respect to the AGV. The frame may be configured to allow the AGV to pass through as the AGV moves along the production line.

The AGV may position the exercise system within the test station to modify, build, test, or transform the exercise system to final product. For example, in block 1104, process 1100 includes deploying at least one test assembly from the test station to perform one or more tests on the exercise system, such as when the AGV is positioned within the test station. Block 1104 may include deploying at least one test assembly from a trolley slidably coupled to the frame of the test station, as described above. For instance, the trolley may move to deploy at least one test assembly on the exercise system based on a position of the AGV within the test station, such as based on the AGV positioning itself within the test station within a threshold tolerance of nominal position.

Various test assemblies may be deployed from the test station. For instance, a spinner assembly, a knob test mechanism, or a sound and vibration test module, or any combination thereof, may be deployed on the exercise system, as described above. The spinner assembly may be configured to drive a portion of a drivetrain of the exercise system. The knob test mechanism may be configured to rotate a knob of the exercise system. The various tests may be controlled by a workstation, such as workstation 106, described above. The workstation may include automation controls, power systems, and safety interlocks/lockouts, or any combination thereof.

In block 1106, process 1100 may include calibrating or testing one or more components of the exercise system. For instance, testing equipment (e.g., workstation 106) may initiate a sequence to calibrate the resistance applied to a flywheel, including identifying a motor (e.g., a stepper motor) position for a minimum resistance, a calibrated maximum resistance, and various steps in between. The calibration values may map the knob positions to calibrated resistance values. The calibration values may then be stored on the exercise system. Calibration may ensure every exercise system coming off the production line is calibrated to the same standard. Calibration may allow a performance comparison between two or more riders exercising on different exercise systems. In some embodiments, the tests performed on the exercise system may be similar to those discussed in International Patent Application No. PCT/US2021/034632, filed May 27, 2021, and entitled "BRAKING SYSTEMS AND METHODS FOR EXERCISE EQUIPMENT," which is hereby incorporated by reference in its entirety for all purposes.

In block 1108, process 1100 may include removing the AGV from the test station after one or more tests are performed. For example, once the exercise system is built and calibrated/tested, the AGV may carry the exercise system away from the test station and further along the production line (e.g., to package and shipping, to another test cell, to quality control, etc.). Block 1108 may include commanding the AGV to leave the test station.

Figure 12:
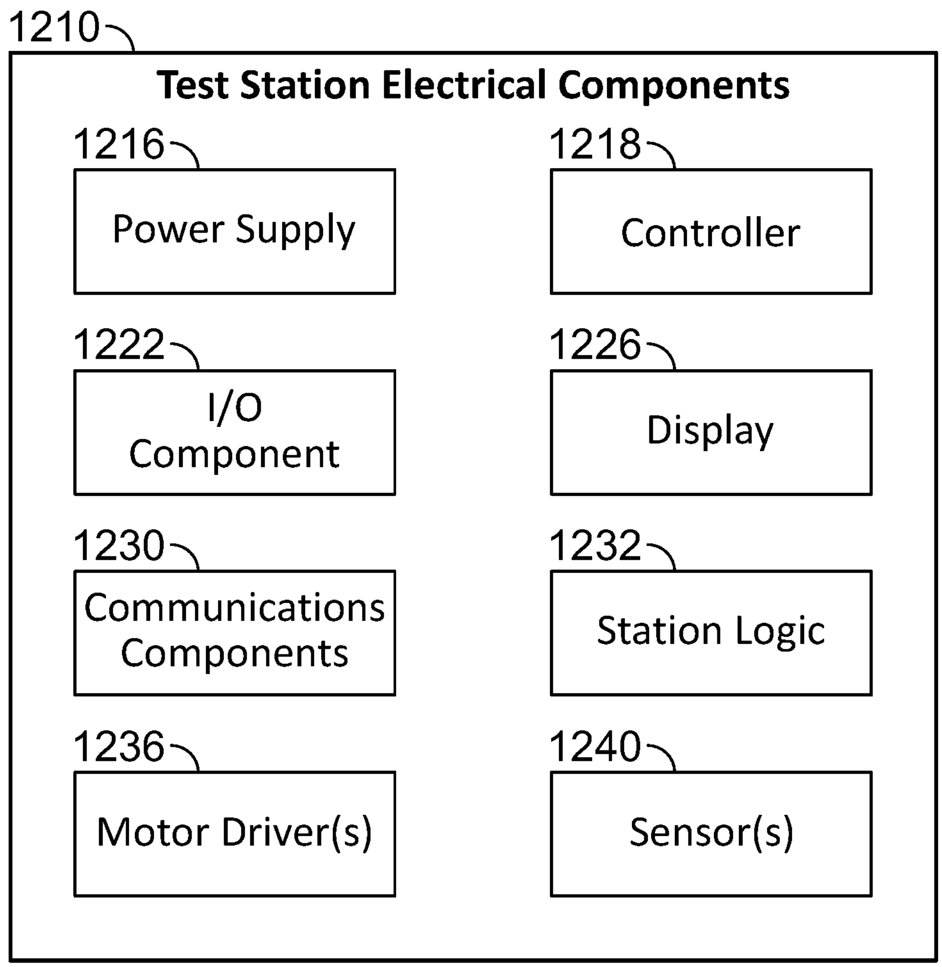
FIG. 12 illustrates electrical and processing components for an example test station, in accordance with various embodiments of the disclosure.

FIG. 12 illustrates electrical and processing components for an example test station (test station electrical components 1210), in accordance with various embodiments of the disclosure. The test station electrical components 1210 facilitate the operation of test station, including communications (e.g., with the exercise apparatus or system), controlling various components and tests, and receiving and processing sensor data. In embodiments, the test station electrical components 1210 include a power supply 1216, a controller 1218, an input/output (I/O) component 1222, a display 1226, communications components 1230, station logic 1232, one or more motor drivers 1236, and one or more sensors 1240, or any combination thereof.

The power supply 1216 may be any power supply suitable to power the test station or components thereof. For instance, power supply 1216 may include one or more batteries or other power supply components. In embodiments, the test station may be plugged into a wall outlet or hardwired to a facility's electrical system to charge the batteries and/or power the test station.

The controller 1218 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), Programmable Logic Controllers (PLCs), or other processing devices used to control the operations of the test station.

I/O component 1222 may process user action, such as selecting keys from a keypad/keyboard and/or selecting one or more buttons, images, or links, such as for inputting or accessing/requesting data, and sends a corresponding signal to controller 1218. I/O component 1222 may also include an output component, such as a display control and a cursor control (such as a keyboard, keypad, mouse, etc.). I/O component 1222 may include an optional audio/visual component to allow a user to use voice for inputting information by converting audio signals and/or input or record images/videos by capturing visual data. I/O component 1222 may allow the user to hear audio and view images/video.

Display 1226 presents information to the user. In various embodiments, display 1226 may be implemented as an LED display, a liquid crystal display (LCD), an organic light emitting diode (OLED) display, and/or any other appropriate display.

Communications components 1230 may include wired and/or wireless interfaces. Wired interfaces may include communications links with various test station components and may be implemented as one or more physical networks or device connect interfaces (e.g., Ethernet, and/or other protocols). Wireless interfaces may be implemented as one or more Wi-Fi, Bluetooth, cellular, infrared, radio, and/or other types of network interfaces for wireless communications and may facilitate communications with wireless devices of test station, AGV, and/or exercise apparatus or system.

Station logic 1232 may be implemented as circuitry and/or a machine-readable medium storing various machine-readable instructions and data. For example, in some embodiments, station logic 1232 may store an operating system and one or more applications as machine readable instructions that may be read and executed by controller 1218 to perform various operations described herein. In some embodiments, station logic 1232 may be implemented as non-volatile memory (e.g., flash memory, hard drive, solid state drive, or other non-transitory machine-readable mediums), volatile memory, or combinations thereof. The station logic 1232 may include status, configuration and control features which may include various control features disclosed herein. In some embodiments, the station logic 1232 executes one or more tests or calibrations to be performed on the exercise apparatus or system, as described above. Status information of the tests, calibration specific values, and other information may be displayed to the user during production.

The one or more motor drivers 1236 may control one or more motors of the test station, such as an actuator (e.g., linear, rotary, etc.) to control movement of the trolley and/or deployment of one or more test assemblies. The one or more sensors 1240 may include sensors for detecting calibration values, AGV position, exercise apparatus position, test assembly position, trolley position, etc.

Figure 13:
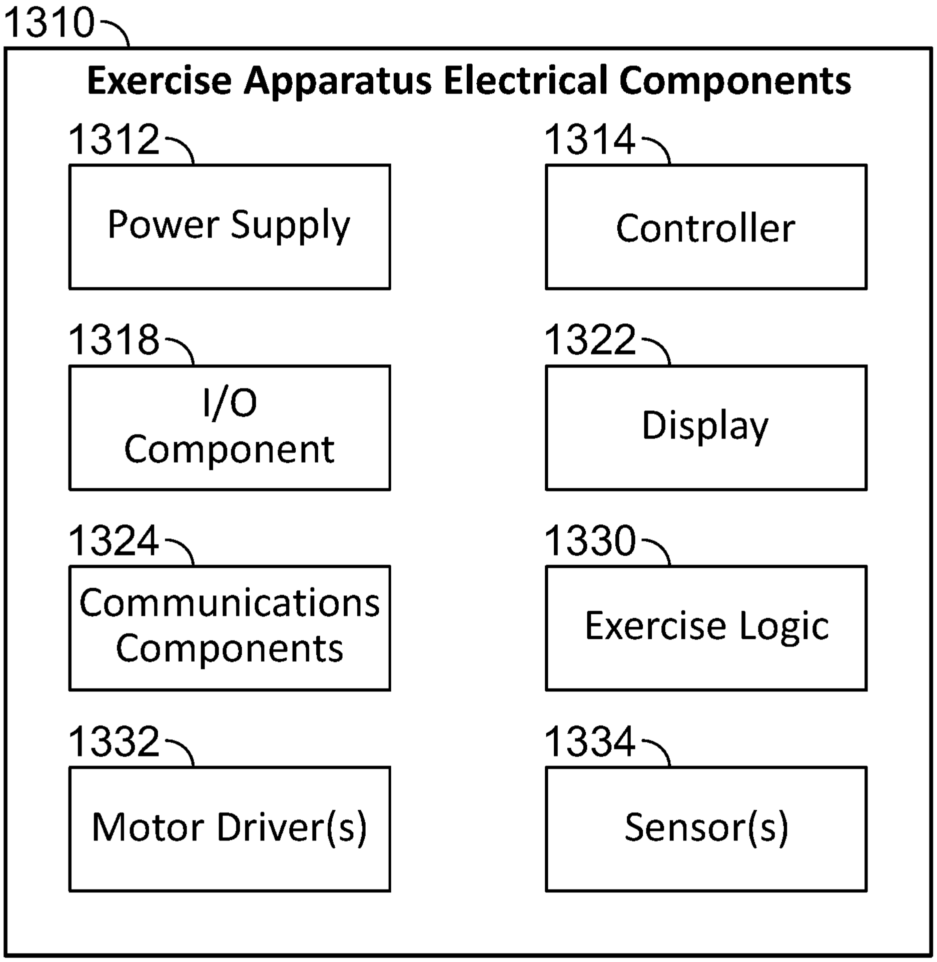
FIG. 13 illustrates electrical and processing components for an example exercise apparatus of system, in accordance with various embodiments of the disclosure.

FIG. 13 illustrates electrical and processing components for an example exercise apparatus or system (exercise apparatus electrical components 1310), in accordance with various embodiments of the disclosure. The exercise apparatus electrical components 1310 facilitate the operation of exercise apparatus or system, including communications (e.g., with the test station), controlling various components, and receiving and processing sensor data. In embodiments, the exercise apparatus electrical components 1310 include a power supply 1312, a controller 1314, an input/output (I/O) component 1318, a display 1322, communications components 1324, exercise logic 1330, one or more motor drivers 1332, and one or more sensors 1334, or any combination thereof.

The power supply 1312 may be any power supply suitable to power the exercise apparatus or system or components thereof. For instance, power supply 1312 may include one or more batteries or other power supply components. In embodiments, the exercise apparatus or system may be plugged into a wall outlet to charge the batteries and/or power the exercise apparatus or system.

The controller 1314 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), or other processing devices used to control the operations of the exercise apparatus or system.

I/O component 1318 may process user action, such as selecting keys from a keypad/keyboard and/or selecting one or more buttons, images, or links, such as for inputting or accessing/requesting data, and sends a corresponding signal to controller 1314. I/O component 1318 may also include an output component, such as a display control and a cursor control (such as a keyboard, keypad, mouse, etc.). I/O component 1318 may include an optional audio/visual component to allow a user to use voice for inputting information by converting audio signals and/or input or record images/videos by capturing visual data. I/O component 1318 may allow the user to hear audio and view images/video.

Display 1322 presents information to the user. In various embodiments, display 1322 may be implemented as an LED display, a liquid crystal display (LCD), an organic light emitting diode (OLED) display, and/or any other appropriate display.

Communications components 1324 may include wired and/or wireless interfaces. Wired interfaces may include communications links with various components and may be implemented as one or more physical networks or device connect interfaces (e.g., Ethernet, and/or other protocols). Wireless interfaces may be implemented as one or more Wi-Fi, Bluetooth, cellular, infrared, radio, and/or other types of network interfaces for wireless communications and may facilitate communications with wireless devices of exercise apparatus or system.

Exercise logic 1330 may be implemented as circuitry and/or a machine-readable medium storing various machine-readable instructions and data. For example, in some embodiments, exercise logic 1330 may store an operating system and one or more applications as machine readable instructions that may be read and executed by controller 1314 to perform various operations described herein. In some embodiments, exercise logic 1330 may be implemented as non-volatile memory (e.g., flash memory, hard drive, solid state drive, or other non-transitory machine-readable mediums), volatile memory, or combinations thereof. The exercise logic 1330 may include status, configuration and control features which may include various control features disclosed herein. In some embodiments, the exercise logic 1330 executes an exercise class (e.g., live or archived) which may include an instructor and one or more other class participants. The exercise class may include a leaderboard and/or other comparative performance parameters for display to the user during the exercise class.

The one or more motor drivers 1332 may control one or more motors of exercise apparatus or system, such as an actuator (e.g., linear, rotary, etc.). The one or more sensors 1334 may include sensors for detecting flywheel RPMs and/or sensors for measuring changes in knob position in response to user adjustments.

Embodiments of the present disclosure include an exercise system test station. The test station may include a frame and a trolley coupled to the frame. The trolley may include at least one deployable test assembly configured to perform one or more tests on an exercise system positioned within the frame. Embodiments of the present disclosure include methods of testing the exercise system using the test station. Embodiments of the present disclosure include methods of operating the test station. The methods may include deploying at least one deployable test assembly from the trolley and performing one or more tests on the exercise system. The methods may include commanding an automated guided vehicle (AGV) to position itself within the test station, the AGV carrying the exercise system through production.

Optionally, the test station may include a workstation configured to manage one or more tests on the exercise system. Optionally, the test station may include a safety light curtain coupled to the frame. Optionally, the trolley may be slidably coupled to a crossmember of the frame. Optionally, the at least one deployable test assembly may include a spinner assembly configured to drive a portion of the drivetrain of the exercise system, a knob tester mechanism configured to rotate a knob of the exercise system, a sound and vibration test module, or any combination thereof. Optionally, the knob tester mechanism may be mounted on an adjustment plate, the adjustment plate movable to adjust the knob tester mechanism to a position of the exercise system within the frame.

Embodiments of the present disclosure include a production line for an exercise system. The production line may include a test station and an automated guided vehicle (AGV) configured to carry an exercise system through production. The test station may include a frame and a trolley coupled to the frame. The frame may allow the AGV to pass through as the AGV moves along the production line. The trolley may include at least one deployable test assembly configured to perform one or more tests on the exercise system when the AGV is positioned within the frame. Embodiments of the present disclosure include methods of testing the exercise system positioned on the AGV in the test station. Embodiments of the present disclosure include methods of operating the production line. The methods may include commanding the AGV to position itself within the test station, the AGV carrying the exercise system through production. The methods may include deploying the at least one deployable test assembly from the trolley and performing the one or more tests on the exercise system.

Optionally, the test station may include a workstation coupled to the frame, the workstation configured to manage the one or more tests on the exercise system. Optionally, the test station may include a safety light curtain coupled to the frame. Optionally, the trolley may be slidably coupled to a crossmember of the frame. Optionally, the at least one deployable test assembly may include a spinner assembly configured to drive a portion of the drivetrain of the exercise system, a knob tester mechanism configured to rotate a knob of the exercise system, a sound and vibration test module, or any combination thereof. Optionally, the knob tester mechanism may be mounted on an adjustment plate, the adjustment plate movable to adjust the knob tester mechanism to a position of the AGV within the frame.

Embodiments of the present disclosure include a method. The method may include commanding an automated guided vehicle (AGV) to position itself within a test station along a production line, the AGV carrying an exercise system through production. The method may include deploying at least one test assembly from the test station to perform one or more tests on the exercise system when the AGV is positioned within the test station.

Optionally, the positioning may include locating the AGV within a frame of the test station, the frame configured to allow the AGV to pass through as the AGV moves along the production line. Optionally, the deploying may include deploying at least one test assembly from a trolley slidably coupled to the frame. Optionally, at least one test assembly may include at least one of a spinner assembly configured to drive a portion of a drivetrain of the exercise system, a knob tester mechanism configured to rotate a knob of the exercise system, or a sound and vibration test module. Optionally, the method may include calibrating one or more components of the exercise system based on one or more tests performed on the exercise system. Optionally, the method may include commanding the AGV to exit the test station after one or more tests are performed.

All relative and directional references (including up, down, upper, lower, top, bottom, side, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An exercise system test station comprising:

a frame; and a trolley coupled to the frame, the trolley comprising at least one deployable test assembly configured to perform one or more tests on an exercise system positioned within the frame, and wherein the at least one deployable test assembly comprises a spinner assembly configured to attach to and drive a portion of a drivetrain of the exercise system.

2. The exercise system test station of claim 1, further comprising a workstation configured to manage the one or more tests on the exercise system.

3. The exercise system test station of claim 1, further comprising a safety light curtain coupled to the frame.

4. The exercise system test station of claim 1, wherein the trolley is slidably coupled to a crossmember of the frame.

5. The exercise system test station of claim 1, wherein the at least one deployable test assembly comprises a knob tester mechanism configured to rotate a knob of the exercise system.

6. The exercise system test station of claim 5, wherein the knob tester mechanism is mounted on an adjustment plate, the adjustment plate movable to adjust the knob tester mechanism to a position of the exercise system within the frame.

7. The exercise system test station of claim 1, wherein the at least one deployable test assembly comprises a sound and vibration test module.

8. A method of operating the exercise system test station of claim 1, the method comprising:

deploying the at least one deployable test assembly from the trolley; and performing the one or more tests on the exercise system.

9. The method of claim 8, further comprising commanding an automated guided vehicle (AGV) to position itself within the exercise system test station, the AGV carrying the exercise system through production.

10. A production line for an exercise system, the production line comprising:

a test station comprising a frame and a trolley coupled to the frame; and an automated guided vehicle (AGV) configured to carry an exercise system through production, wherein the frame allows the AGV to pass through as the AGV moves along the production line, and wherein the trolley comprises at least one deployable test assembly configured to perform one or more tests on the exercise system when the AGV is positioned within the frame, and wherein the at least one deployable test assembly comprises a spinner assembly configured to attach to and drive a portion of a drivetrain of the exercise system.

11. The production line of claim 10, wherein the test station comprises a workstation coupled to the frame, the workstation configured to manage the one or more tests on the exercise system.

12. The production line of claim 10, wherein the test station comprises a safety light curtain coupled to the frame.

13. The production line of claim 10, wherein the trolley is slidably coupled to a crossmember of the frame.

14. The production line of claim 10, wherein a knob tester mechanism configured to rotate a knob of the exercise system, or a sound and vibration test module.

15. The production line of claim 14, wherein the knob tester mechanism is mounted on an adjustment plate, the adjustment plate movable to adjust the knob tester mechanism to a position of the AGV within the frame.

16. A method of operating the production line of claim 10, the method comprising:

commanding the AGV to position itself within the test station;

deploying the at least one deployable test assembly from the trolley; and performing the one or more tests on the exercise system.

17. A method comprising:

commanding an automated guided vehicle (AGV) to position itself within a test station along a production line, the AGV carrying an exercise system through production; and deploying at least one test assembly from the test station to perform one or more tests on the exercise system when the AGV is positioned within the test station, wherein the at least one deployable test assembly comprises a spinner assembly configured to attach to and drive a portion of a drivetrain of the exercise system.

18. The method of claim 17, further comprising calibrating or testing one or more components of the exercise system.

19. The method of claim 17, further comprising removing the AGV from the test station after one or more tests are performed on the exercise system.

20. The exercise system test station of claim 1, further comprising:

a motor or actuator configured to move the trolley between the parked position and the deployed position, and a sensor configured to determine a position of the trolley within the exercise system test station.

* * * * *